Dec. 8, 1959  R. L. PANICCI  2,916,085
SPRING MEANS FOR CHAISE LOUNGE
Filed June 19, 1958
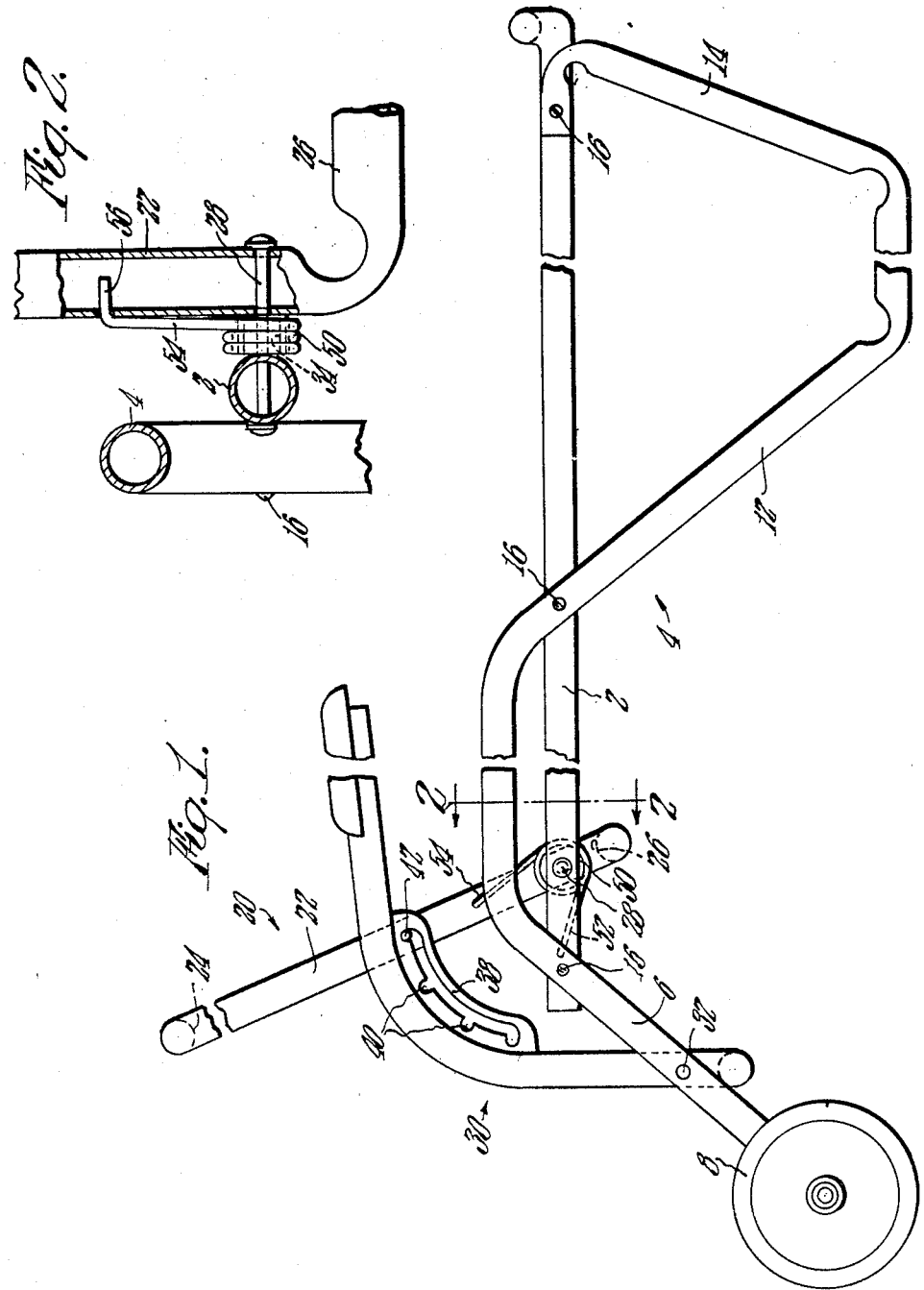
INVENTOR.
Richard L. Panicci.
BY Rosor Ross, Attys.

United States Patent Office 2,916,085
Patented Dec. 8, 1959

2,916,085

SPRING MEANS FOR CHAISE LOUNGE

Richard L. Panicci, Northampton, Mass., assignor to Hampden Specialty Products, Inc., Easthampton, Mass., a corporation Application June 19, 1958, Serial No. 743,120

1 Claim. (Cl. 155—159)

This invention relates to improvements in chaise lounge, and is directed more particularly to means for acting on the back-rest thereof.

The principal object of the invention is the provision of spring means for urging the back-rest of a chaise lounge forwardly when released from a rearward position of adjustment thereof.

A chaise lounge is usually provided with a back-rest having opposite sides thereof pivoted to opposite sides of a frame adjacent thereto for swinging between a forward position and adjusted positions rearwardly thereof, in combination with ratchet means adapted to releasably hold the back-rest in adjusted position.

According to the novel features of the invention spring means is provided for urging the back-rest forwardly when released by the ratchet means. An occupant of the lounge with the back resting against the back-rest may desire to shift to a more upright position of the back-rest. The occupant leans forwardly releasing the ratchet means and the spring means functions to swing the back-rest forwardly, that is the back-rest follows the back of the occupant as he leans forwardly. The ratchet means is allowed to engage, and the back-rest is releasably locked in the desired new position.

Not only is the spring means efficient in operation for the intended purpose but it encompasses the pivotal connection of the back-rest and frame. Thereby the spring means is compact in form to occupy but small space, is not only substantially concealed so as to not impair the appearance of the chair, but there are no protuberances upon which the occupant or clothing is likely to become caught.

While various changes and modifications may be made within the spirit and scope of the invention it will be understood that the invention is adapted for wide application, and is not limited to the chaise lounge, referred to hereinafter.

In the drawings:

Fig. 1 is a side elevational view of a chaise lounge embodying the novel features of the invention; and Fig. 2 is an enlarged sectional elevational view on the line 2—2 of Fig. 1.

Referring now to the drawings more in detail the novel features of the invention will be described in detail.

A frame structure of a chaise lounge includes an elongated body supporting structure 2, and leg members 4, secured thereto. The leg members have rearwardly depending portions 6 on which wheels 8 are pivoted at 10, and forward leg portions 12 which extend downwardly for resting upon the ground or floor, and then they extend upwardly, as at 14. The parts are rigidly secured together by screws, rivets or the like, indicated by 16.

A back-rest 20 is provided which has opposite sides or side members such as 22, which are connected at upper ends by a transverse member 24, and preferably at lower ends by a similar member 26.

The side members 22 of the back-rest are swingable on pivot rods 28 which extend through said members, and the elongated members 2. The members 22 are spaced from the members 2 by hollow spacers 34, as indicated in Fig. 2.

The frame and back-rest of the lounge may be upholstered, or provided with webbing or the like so as to be suitable for functioning as a support for the body. The back-rest and frame may be formed from tubing, according to the well known practice.

Opposite side arms 30 which may be formed from tubing are pivoted at 32 to the leg portions for swinging up and down relative thereto.

The side arms carry ratchet plates, such as 38, which are provided with notches 40, and studs or pins 42 extend outwardly from opposite sides of the back-rest, which are receivable in the notches 40. The back-rest is releasably held in various adjusted positions by engagement of the studs 42 in the notches 40 of the plates 38.

Spring means is provided and includes coil springs 50 surrounding the spacers 34. Said coils have elongated end portions 52 and 54 which terminate in hooks such as 56, shown in Fig. 2. Said hooks 56 are received in suitable apertures provided in the sides of the back-rest and frame members 2.

The spring means is adapted to urge the back-rest forwardly when the studs and ratchet notches are disengaged.

When an occupant desires to position the back-rest in a more rearward position, the side arms are elevated to release the studs from the notches of the plates 38, and the occupant leans against said back-rest to swing it rearwardly to the desired position, when the side arms are released for engagement of the ratchet mechanism. Rearward movement of the back-rest is of course against the action of the spring means.

When it is desired to adjust the back-rest to a more forward position, the occupant leans forwardly to relieve the back-rest of weight or pressure, and elevates the side arms to disengage the ratchet means.

The back-rest being relieved of pressure or weight, and being free to swing forwardly the spring means urges the back-rest forwardly to the desired position when the occupant may release the side arms for engagement of the ratchet means, thereby to hold the back-rest in the desired position.

It will be noted that the spring means is compact, and substantially concealed so as not to be conspicuous to impair the appearance of the chair, while at the same time said spring means is efficient in operation for the intended purpose.

The novel features of the invention may be used with various structures and it is desired to be limited, if at all, by the appended claim, rather than by the foregoing disclosure.

I claim:

A chaise lounge construction comprising in combination, a main body supporting frame including elongated transversely spaced horizontal side members provided with forward and rear end portions and having forward and rear supporting legs depending from said end portions, a back rest frame having transversely spaced opposite side members with lower portions thereof disposed inside of the side members of said main frame, pivotal connections between the lower portions of the side members of the back rest frame and rear portions of the side members of the main frame for swinging of the back rest frame between forward and rear relatively upright and reclining positions, the lower portions and rear portions of the side members of the back rest and main frame being spaced apart by spacers provided around said pivotal connections, arm rest means having rear transversely spaced portions pivotally connected to said rear legs and extending upwardly therefrom and terminating in forwardly extending arm rests disposed above said main frame, ratchets carried by said arm rest means provided with spaced notches and studs provided on the side members of the back rest engageable in said notches in lower position of the arm rests to hold the back rest against swinging, tension coil springs having convolutions thereof around said spacers between the spaced adjacent members of the back rest and main support having elongated opposite ends extending rearwardly and upwardly respectively therefrom and terminating in hooks, the side members of the back rest and rear portions of the side members of the main support provided with apertures in which said hooks are engaged, all adapted and arranged whereby as said studs are disengaged from the notches of said ratchets said coil springs urge the back rest forwardly.

References Cited in the file of this patent

UNITED STATES PATENTS

| | | |
|---|---|---|
| 875,760 | White | Jan. 7, 1905 |
| 2,690,793 | Pederson et al. | Oct. 5, 1954 |
| 2,825,392 | Pederson et al. | Mar. 4, 1958 |
| 2,874,060 | Pearlstine | Aug. 12, 1958 |